Sept. 24, 1929. G. T. POWERS 1,729,184
VEHICLE LICENSE PLATE ASSEMBLY
Filed May 12, 1928
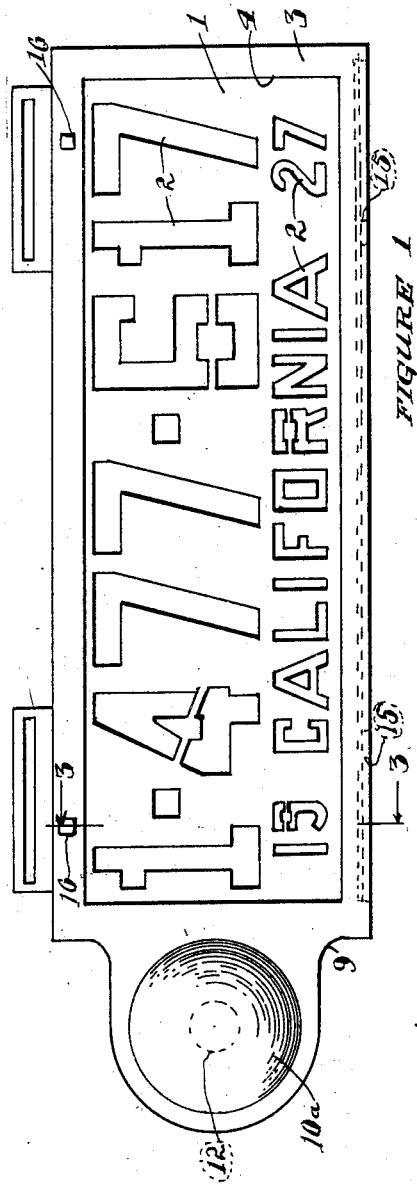
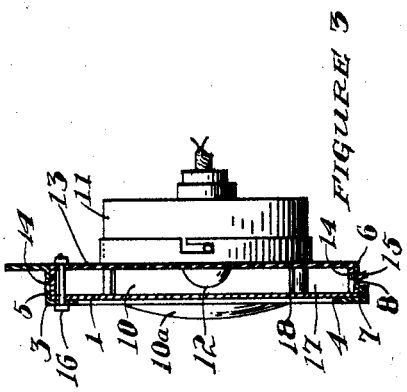
INVENTOR
George T. Powers
John A. Naismith
ATTORNEY Patented Sept. 24, 1929

1,729,184

UNITED STATES PATENT OFFICE

GEORGE T. POWERS, OF SAN FRANCISCO, CALIFORNIA

VEHICLE LICENSE-PLATE ASSEMBLY

Application filed May 12, 1928. Serial No 277,357.

The present invention relates more particularly to an illuminated license plate for vehicles.

It is one object of the invention to provide a device of the character indicated so formed and constructed and illuminated that the figures and letters of the plate may be readily distinguished after dark.

It is another object of the invention to provide a device of the character indicated whereby a single lamp may be utilized for illuminating all of the figures and letters on the plate as well as to function in the usual manner as a tail light.

It is also an object of the invention to provide a device of the character indicated so constructed and assembled as to be economical to manufacture, quickly and easily assembled and disassembled, strong, durable, and highly efficient in its practical application.

In the drawing:

Figure 1 is a front elevation of a device embodying my invention.

Figure 2 is a plan view of the same.

Figure 3 is a sectional view on line 3—3 of Figure 1.

Referring now more particularly to the drawing, I show at 1 a vehicle license plate formed of a sheet of metal and in which appropriate numbers and letters are cut as at 2 to form a stencil.

At 3 I show a metal frame having an opening 4 formed therein sufficiently large to expose the entire face of plate 1 when the same is placed therein. In the present instance the top and one end of the frame are turned backwardly to form a flange 5, and the bottom is turned backwardly to form a flange as 6 with a groove 7 formed therein. This lower flange 6 has spaced openings or slots formed therein as indicated at 8. These several parts are so proportioned that when a plate as 1 is inserted therein the lower edge of the plate will rest in the groove 7 and the upper edge of the plate will fit snugly against the upper flange 5.

In the embodiment of the invention herein disclosed I have shown the end of the frame as 9 formed into a chamber 10 having a window of suitable translucent material such as red glass mounted therein. This chamber is fitted with a closure 11 at the back thereof, and an electric lamp 12 is mounted therein as shown, the connections to the lamp not being shown.

At 13 is shown a back plate having forwardly directed flanges as 14 formed thereon and adapted to fit snugly within the flanges on frame 3. This plate is held in position by means of fingers 15 on its lower edge engaging the slots 8 in bottom flange 6, and by means of bolts as 16 engaging the frame 1 and back plate 13 as shown.

By means of this construction a chamber is formed as at 17 between the plate 1 in frame 3 and the rear plate 13, and the plate 1 is held rigidly in position in the frame through its engagement with the groove 7 and through the seating of the flanges 14 on back plate 13 against the same. These flanges are brought into positive contact with the plate 1 through the medium of the bolts 16 and through the engagement of the fingers 15 with the rear edges of the slots 8.

The closure 11 is shown as extending into the chamber 10, but an opening as 18 is formed in the side of the closure so that when the device is assembled as described and the lamp is illuminated its rays will not only illuminate the window 10$^a$ which therefore functions as a tail-light, but they will also pass through opening 18 and flood the chamber 17. The flooding of the chamber 17 with light effectually illuminates the letters and figures cut in the plate 1 since the inner surface of back plate 13 is provided with a suitable reflecting surface whereby the light rays are reflected directly through the several openings forming the said letters and figures.

It is to be understood, of course, that while I have herein shown and described but one specific embodiment of the invention, changes in form, construction, and method of assembly and operation may be made within the scope of the appended claim.

Upwardly extending slotted plates as 19 are formed on the back edge of the top flange 5 for use in mounting the device on a vehicle.

I claim:

In a device of the character described, a frame having a front opening therein to expose a vehicle license plate and having a backwardly turned flange formed on its upper and lower and one end edge, the other end having a chamber formed thereon of greater depth than the depth of said flanges and having a window in the front thereof and a closure in the back thereof, a lamp mounted on said closure and disposed within said chamber, and a back for the plate having forwardly turned flanges on its top, bottom and one end edge to engage the flanges on the frame, means for securing the back to the frame, and means for mounting the frame on a vehicle, the space between the plate and back having open communication with the chamber.

GEORGE T. POWERS.